US005078911A

United States Patent [19]

Wigglesworth et al.

[11] Patent Number: 5,078,911

[45] Date of Patent: Jan. 7, 1992

[54] APPARATUS FOR MAKING A POST-FOAMING GEL

[75] Inventors: Paul Wigglesworth, Manchester; Roger D. Ellis, Lancashire, both of Great Britain

[73] Assignee: Colgate-Palmolive Company, Piscataway, N.J.

[21] Appl. No.: 365,254

[22] Filed: Jun. 12, 1989

Related U.S. Application Data

[62] Division of Ser. No. 131,126, Dec. 10, 1987, Pat. No. 4,876,038.

[51] Int. Cl.[5] ........................ B01J 13/00; C09K 3/30; B65B 1/04; C11D 17/00

[52] U.S. Cl. ................................ 252/315.3; 252/314; 252/305; 252/90; 261/DIG. 26; 141/3

[58] Field of Search .............. 252/90, 305, 314, 315.3, 252/315.4; 261/DIG. 26; 141/3

[56] References Cited

U.S. PATENT DOCUMENTS

| | | | |
|---|---|---|---|
| 338,538 | 3/1886 | Marchand . | |
| 492,945 | 3/1893 | Phegley . | |
| 1,843,157 | 2/1932 | Howe . | |
| 3,541,581 | 11/1970 | Monson | 252/305 |
| 3,860,218 | 1/1975 | Hurlimann | 259/98 |
| 4,312,594 | 1/1982 | Woodle | 366/150 |
| 4,350,650 | 9/1982 | Cereghini | 264/39 |
| 4,405,489 | 9/1983 | Sisbarro | 252/315.4 |
| 4,482,704 | 11/1984 | Luetzelschwab | 528/480 |
| 4,589,452 | 5/1986 | Clanet | 141/3 |
| 4,595,566 | 6/1986 | Byrd et al. | 422/134 |
| 4,727,914 | 3/1988 | Anderson, III et al. | 141/105 |
| 4,753,747 | 6/1988 | Clark et al. | 252/90 |
| 4,913,197 | 4/1990 | Friedrich | 141/3 |
| 4,915,881 | 4/1990 | Straw et al. | 261/DIG. 26 X |

FOREIGN PATENT DOCUMENTS

| | | | |
|---|---|---|---|
| 2035775 | 3/1972 | Fed. Rep. of Germany . | |
| 2402582 | 4/1979 | France . | |
| WO8801876 | 3/1988 | PCT Int'l Appl. | 252/315.4 |

OTHER PUBLICATIONS

Derwent Abstracts, 79-F2196B/24.
Derwent Abstract, 72-21477B/14.

*Primary Examiner*—Richard D. Lovering
*Assistant Examiner*—Daniel S. Metzmaier
*Attorney, Agent, or Firm*—Richard J. Ancel; Robert C. Sullivan

[57] ABSTRACT

An apparatus for making a post-foaming gel comprising, a first cylinder having a chamber and a slidable piston separating the chamber into a first compartment to receive a gel base and a second compartment, a second cylinder having a chamber and a slidable piston separating the chamber into a first compartment to receive the gel base and a second compartment, a conduit connecting the first compartments of the first and second cylinders, a device for reciprocating the pistons in the first and second cylinders to cycle the gel base through the conduit between the first compartments of the first and second cylinders, and a device for introducing a foaming agent to the gel base while it is being cycled between the cylinders.

5 Claims, 1 Drawing Sheet

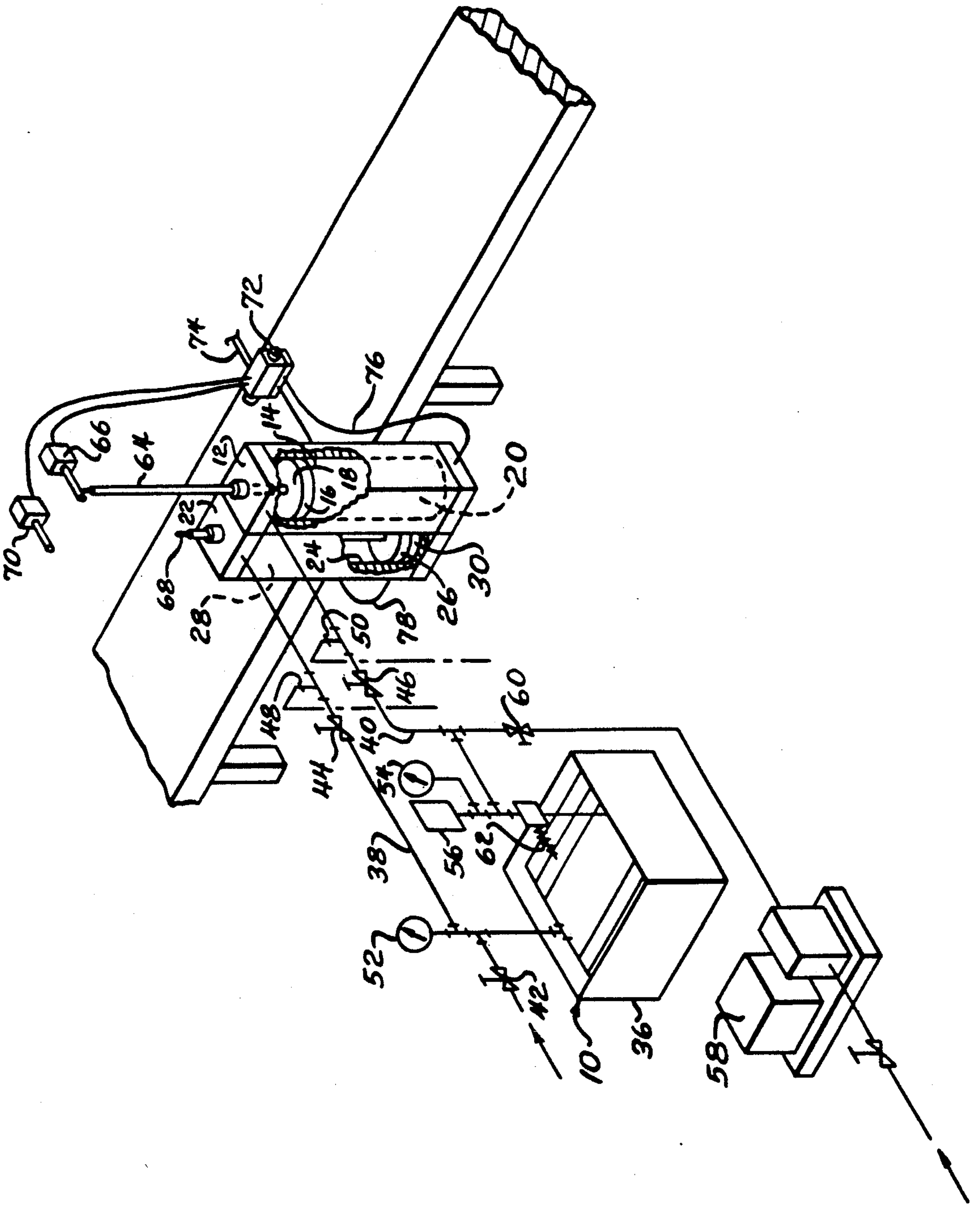
70
68
66
64
22
12
14
72
74
76
16
18
20
24
28
30
26
78
50
46
48
44
40
60
34
38
56
62
52
42
10
36
58

APPARATUS FOR MAKING A POST-FOAMING GEL

REFERENCE TO RELATED APPLICATION

This is a division of application Ser. No. 131,126, filed Dec. 10, 1987, for "Apparatus for Making a Post-Foaming Gel," now U.S. Pat. No. 4,876,038, issued Oct. 24, 1989.

BACKGROUND OF THE INVENTION

The present invention relates to an apparatus and method for making a post-foaming gel.

Before the present invention, attempts have been made to add foaming agents, such as pentane/butane mixtures to gel bases in conventional partly filled pressure vessels to make a post-foaming gel. However, any post foaming gel of cosmetically acceptable stiffness will tend to foam spontaneously when exposed to atmospheric pressure if it contains bubbles of air or hydrocarbon. These act as nuclei for foaming, by expanding and shearing the gel in their immediate vicinity. This means that pentane/butane mixtures cannot be incorporated into gel base in a conventional, partly-filled pressure vessel, even when the headspace is pressurized with air or nitrogen. Inevitably some of the water-soluble gas will be entrained in the gel. The resulting spontaneous foaming makes filling into cans very difficult and messy. Even then the product will not settle down on storage to give a satisfactory result.

Taking a potentially 'easy' situation, such as adding only isopentane (B.Pt. 29° C.) or n-pentane (B.Pt. 37° C.), there are still problems. Assuming a good gel is produced by cold mixing, you will find that at temperatures around 20° C. the mixing does vaporise significant amounts of foaming agent and the resulting gel is foamy.

These bubbly gels are not suitable for packing into cans because the external propellant used with the cans gives insufficient pressure to collapse the bubbles on storage. This is largely due to the fact that these gels have a yield value such that they resist the applied pressure (or fail to transmit the full effect to the bubbles).

A post-foaming gel is disclosed in U.S. Pat. No. 3,541,581. A continuous method and apparatus to make a post-foaming gel is disclosed in U.S. Pat. No. 4,405,489. The filling of an aerosol can containing an interior plastic bag which holds the product to be dispensed is disclosed in U.S. Pat. No. 4,589,452.

SUMMARY OF THE INVENTION

A principal feature of the present invention is the provision of an apparatus for making a post-foaming gel.

The apparatus of the present invention comprises, a first cylinder having a chamber and a slidable piston separating the chamber into a first compartment to receive a gel base and a second compartment, a second cylinder having a chamber and a slidable piston separating the chamber into a first compartment to receive the gel base and a second compartment, and conduit means connecting the first compartments of the first and second cylinders.

A feature of the present invention is the provision of means for reciprocating the piston in the first and second cylinders to cycle the gel base through the conduit means between the first compartments of the first and second cylinders.

Yet another feature of the invention is the provision of means for introducing foaming agent to the gel base while it is being cycled between the cylinders.

Thus, a feature of the present invention is that the apparatus forms a post-foaming gel from the gel base and foaming agent in a simplified manner.

A further feature of the present invention is that the apparatus eliminates the necessity for a motor drive pump.

Yet another feature of the invention is that the apparatus is flame proof.

Still another feature of the invention is that the cycle time for forming the post-foaming gel is reduced.

A feature of the present invention is that the apparatus is of simplified construction and can be made at a reduced cost.

Another feature of the invention is that the amount of air is minimized while filling gel into the apparatus.

Still another feature of the invention is that air is bled from the apparatus while filling the cylinders with the gel.

A feature of the invention is the provision of a method for making the post-foaming gel.

Further features will become more fully apparent in the following description of the embodiments of this invention and from the appended claims.

DESCRIPTION OF THE DRAWINGS

In the drawings:

FIG. 1 is a diagrammatic view of an apparatus for making a post-foaming gel of the present invention.

DESCRIPTION OF THE PREFERRED EMBODIMENTS

Referring now to FIG. 1, there is shown an apparatus generally designated 10 for making a post-foaming gel from a gel base and foaming agent. The apparatus 10 has a first vertically disposed cylinder 12 having a chamber 14 and a slidable piston 16 separating the chamber 14 into a first upper compartment 18 to receive a gel base and a second compartment 20 to receive a compressed gas. The apparatus 10 has a second vertically disposed cylinder 22 having a chamber 24 and a slidable piston 26 separating the chamber 24 into a first upper compartment 28 to receive the gel base and a second compartment 30 to receive a compressed gas, with the first and second cylinders 12 and 22 being disposed in a side-by-side configuration.

The apparatus 10 has a heat exchanger 36, and a first conduit 38 connecting the hèat exhanger 36 to the first compartment 28 of the second cylinder 22, and a second conduit 40 connecting the heat exchanger 36 to the first compartment 18 of the first cylinder 12. The first conduit 38 has a first valve 42 for introducing a foaming agent into the first conduit 38. The first and second conduits 38 and 40 have respective valves 44 and 46 for a purpose which will be described below. The first and second conduits have respective bleed lines 48 and 50 which will be further described below. The first conduit 38 has a pressure gauge 52, and the second conduit 40 has a pressure gauge 54 and a pressure switch 56 to relieve pressure in the event that there exists excessive pressure in the apparatus 10.

The gel base is supplied by a pump 58 through a valve 60 into the second conduit 40 and apparatus 10 as will be further described below. The second conduit 40 also has a thermocouple 62 to measure the temperature of the gel base in the apparatus 10.

The piston 16 of the first cylinder 12 has an elongated shaft 64 extending vertically out of the cylinder to activate a respective switch 66 when the piston is located in an upper part of the first cylinder 12. The piston 26 of the second cylinder 22 also has an elongated shaft 68 which activates a respective switch 70 when the piston 26 is located adjacent an upper part of the second cylinder 22. The switches 66 and 70 are pneumatically connected to a control system 72 of known type, in order to render the apparatus fully flame proof, which controls the passage of pressurized gas to and from a source line 74 of gas through conduits 76 and 78 to the second compartments 20 and 30 of the respective first and second cylinders 12 and 22.

The gel base is made in the following manner according to the formulation set forth below:

(1) Add approximately 20% of the water to a closed mixing vessel.

(2) Add fatty acid to the mixing vessel and then the GMS/color then heat to 80°-85° C. until all powdered materials have melted.

(3) Add the triethanolamine to the vessel with agitation to form a soap. Cool to 60° C. Add the Hydroxyethyl cellulose.

(4) Cool to 40° C. and add the Hydroxypropyl cellulose.

(5) Add the sorbitol solution, with agitation, to the aqueous soap.

(6) Cool the mixture to 30° C., add the perfume with agitation.

The gel base has the following formulation:

| BASE | % |
|---|---|
| Palmitic Acid | 8.0-10.0 |
| Stearic Acid | 1.0-3.0 |
| Triethanolamine | 5.5-7.5 |
| Sorbitol - 70% solution | up to 3.0 |
| Hydroxyethyl cellulose | 0.1-0.4 |
| Hydroxypropyl cellulose | 0.05-0.15 |
| Glyceryl Monostearate | 0.4-0.6 |
| Perfume | q.s. |
| Coloring Material | q.s. |
| Water | to 100% |

The finished product has the following formulation:

| FINISHED PRODUCT | |
|---|---|
| Base as above | 97.0-98.0 |
| Iso-Pentane | 1.5-1.8 |
| Iso-Butane | 0.5-1.2 |

In use of the apparatus 10, first the control system 72 controls the gas pressure in the second compartments 20 and 30 to position the pistons 16 and 26 adjacent an upper part of the respective cylinders 12 and 22 in order to minimize the amount of air in the cylinders, after which the gel base is passed through the valve 60 into the apparatus 10 while bleeding air through the bleed lines 48 and 50. In this manner, the location of the pistons are controlled while filling the gel base and bleeding air in order to obtain a more controlled filling rate and discharge any residual air from the first compartments 18 and 28 and apparatus 10.

Next, the gas is removed from the second compartment 30 of the second cylinder 22 by the system 72 in order to position the piston 26 adjacent the lower part of the second cylinder 22, or vice-versa, the system 72 may lower the piston 16 to a lower position while the piston 26 remains in an upper position, while the gel base is filled into the first compartment of the respective cylinder.

Once the pistons 16 and 26 are located in the desired starting positions, the system 72 sequentially introduces and removes compressed gas to and from the second compartments 20 and 30 of the first and second cylinders 12 and 22 in order to reciprocate the pistons in the cylinders and cycle the gel base through the first and second conduits 38 and 40 and heat exchanger 36 while introducing the foaming agent through the valve 42 into the first conduit 38 and apparatus 10, while the system 72 compensates for the added volume of the foaming agent comprising iso-pentane and iso-butane.

During foaming agent addition, the cylinders are cycled to avoid accumulation of undispersed material, and final total cycling is dependent on conditions such as formula and temperature.

After cycling has been completed, aerosol cans having two compartments are filled from either valve 46 or valve 44, and adjusting air pressure to give controlled delivery of gassed gel. The aerosol valves are crimped in place and the outer compartments of the cans are gassed with a few grams of propellant after which the samples are ready for use.

In this manner, a post foaming gel is formed in a simplified manner by the apparatus. According to a method of making a post-foaming gel, a gel is cycled between first and second cylinders, and a foaming agent is introduced to the cycled gel base.

The foregoing detailed description is given for clearness of understanding only, and no unnecessary limitations should be understood therefrom, as modifications will be obvious to those skilled in the art.

What is claimed is:

1. A method of making a post-foaming gel, comprising the steps of:

minimizing the amount of air in the first and second cylinders by adjusting the position of the pistons therein, said first and second cylinders being in communication;

filling a gel base into said first cylinder while bleeding air from said cylinders;

cycling the gel base between said first and second cylinders; and introducing a foaming agent to the gel base while being cycled between said first and second cylinders while minimizing the air in said cylinders by compressing said pistons.

2. The method of claim 1, including the step of controlling gas pressure on pistons in the cylinders during the filling step.

3. A method according to claim 2, wherein said gel is cycled by reciprocating said pistons.

4. A method according to claim 1, wherein said pistons are initially positioned adjacent an upper part of said cylinders in order to minimize the amount of air in said cylinders.

5. The method of claim 1, wherein, after the gel has been introduced into said first cylinder, the piston in said second cylinder is lowered to a position adjacent the lower part of said cylinder.

* * * * *